United States Patent [19]

Joiner, Jr.

[11] Patent Number: 4,491,620

[45] Date of Patent: Jan. 1, 1985

[54] FLEXIBLE, NONSTAINING TOPCOAT FOR AN X-RAY INTENSIFYING SCREEN

[75] Inventor: James R. Joiner, Jr., Towanda, Pa.

[73] Assignee: E. I. Du Pont de Nemours and Company, Wilmington, Del.

[21] Appl. No.: 420,486

[22] Filed: Sep. 20, 1982

[51] Int. Cl.³ .......................... G01J 1/58; B32B 27/20; B32B 27/36; B32B 27/30

[52] U.S. Cl. ................................ 428/421; 250/483.1; 250/488.1; 378/185; 428/422; 428/458; 428/461; 428/463; 428/480; 428/483; 428/690; 428/691; 428/910; 428/913

[58] Field of Search ............... 428/690, 691, 480, 421, 428/422, 458, 910, 463, 461, 913; 250/483.1, 488.1; 378/185

[56] References Cited

U.S. PATENT DOCUMENTS

| | | | |
|---|---|---|---|
| 2,907,882 | 10/1959 | Patten et al. | 250/80 |
| 3,043,710 | 7/1962 | Patten et al. | 117/33.5 |
| 3,164,719 | 1/1965 | Bauer | 250/30 |
| 3,282,905 | 11/1966 | Fasick et al. | 260/89.5 |
| 3,787,238 | 1/1974 | Juliano | 428/691 |
| 4,059,768 | 11/1977 | Landeghem et al. | 250/483 |
| 4,205,116 | 5/1980 | Landeghem et al. | 428/409 |
| 4,225,653 | 9/1980 | Brixner | 428/690 |
| 4,360,571 | 11/1982 | Rabatin | 428/691 |

*Primary Examiner*—Ellis P. Robinson

[57] ABSTRACT

A topcoat or abrasion layer useful for protecting an X-ray intensifying screen comprising a copolymer of a fluoroester and methylmethacrylate. This topcoat is flexible, adhesive, and nonstaining and permits the use of the X-ray screen in the modern, rapid changer systems.

9 Claims, No Drawings

FLEXIBLE, NONSTAINING TOPCOAT FOR AN X-RAY INTENSIFYING SCREEN

BACKGROUND OF THE INVENTION

This invention relates to X-ray intensifying screens having a protective topcoat or abrasion layer coated thereon. More particularly, this invention relates to a combination of X-ray screens with photographic film having improved performance in automatic changer systems.

DESCRIPTION OF THE PRIOR ART

Traditionally, X-ray intensifying screens comprise, in order, (a) a support, (b) an active layer comprising a fluorescent phosphor dispersed in a suitable binder and, (c) a protective topcoat or abrasion layer coated over the active layer to protect said active layer during use. In addition, the screen may also contain a reflective layer to enhance the utility thereof when used to expose silver halide photographic films. This reflective layer (e.g., $TiO_2$ dispersed in a suitable binder) is coated between the active layer and the support. Alternatively, the reflective layer may be coated on the opposite side of the support, or the reflective material incorporated directly into the support during manufacture thereof.

The above described screens are eminently useful in conjunction with photographic silver halide X-ray film. Such films consist essentially of a gelatino-silver halide emulsion coated on both sides of a support (so-called "double-side coated"). In this case, two X-ray screens are usually employed, one positioned on each side of the double-side coated film, and encased in a suitable cassette. The cassette is then placed in proximity to the patient in the area desired, and the patient exposed to X-rays. The film is then removed and processed in conventional manner. Most of this handling must be done in the dark to protect the film from exposure.

Modern hospitals, however, where a large number of X-ray exposures are made on a daily basis, now use automatic changer and processing devices. These changer devices contain successive light sensitive films and one or more X-ray screens. Each unexposed film is successively fed into position between a pair of X-ray screens, exposed, and automatically unloaded. The feed path of the film changes direction abruptly near the entrance to the space between the screens. Conventional X-ray screens have protective topcoats comprising, for example, cellulose acetate or other polymeric materials that form a coherent layer on coating. These topcoats are inadequate to shield the active layer from abrasion caused by the rapid exchange of the film in and out of the automatic changer systems. In addition, the prior art topcoats tend to stain when accidentally contacted by processing fluids (e.g., developer and fixer) associated with the film development. The failure of the topcoat shortens the useful life of the X-ray screen, and the staining may cause unwanted image areas to appear on the film during exposure. Neither of these two defects can be tolerated in the medical X-ray area where a patient's life may depend on the results.

BRIEF SUMMARY OF THE INVENTION

The present invention is directed to an X-ray image intensifying screen comprising, in order, (a) a support, (b) an active layer on said support comprising fluorescent phosphor particles dispersed in a film-forming binder, and, (c) a protective topcoat coated on said active layer, and characterized in that said topcoat comprises a copolymer of a fluoroester of the formula:

$$CF_3-CF_2-(CF_2-CF_2)_n-CH_2-CH_2-O-\overset{\displaystyle O}{\overset{\|}{C}}-\overset{\displaystyle CH_3}{\overset{|}{C}}=CH_2$$

wherein n is an integer from 2 to 9, and methylmethacrylate.

X-ray intensifying screens made with the protective topcoat described above can be handled, with extended life, in automatic, rapid changer systems, show excellent resistance to staining, and resist failure between said topcoat and the active layer. When used in conjunction with X-ray photographic films, these screens produce sharper images than those produced using conventional X-ray screens made with conventional topcoats.

DETAILED DESCRIPTION OF THE INVENTION

The fluoroesters useful in the preparation of the copolymers employed in the protective topcoat of this invention, and the process for their preparation are disclosed in U.S. Pat. Nos. 3,542,461 and 3,282,905. The latter patent describes the reaction of a fluorinated alcohol (e.g., 1H,1H,2H,2H-heptafluoropentanol-1) with a copolymerizable vinyl compound (e.g., an alkyl acrylate) to form the fluoroester. It is preferred to use a fluoroester of the formula $$CF_3-CF_2-(CF_2-CF_2)_n-CH_2-CH_2-O-\overset{\displaystyle O}{\overset{\|}{C}}-\overset{\displaystyle CH_3}{\overset{|}{C}}=CH_2$$

where n is an integer from 2–9 and more preferably 3–5. Mixtures of fluoroesters of varying chain length are common in the preparation of these compounds and their concentration (e.g. where n is 3–5) can only be obtained by fractional distillation of the broader range of mixtures. The fluoroesters are not, of themselves, useful as protective topcoats since they are normally fluid and are thus readily absorbed into the active layer. Hence, these compounds must be copolymerized with methylmethacrylate, in varying proportions of 3% to 98% by weight of fluoroester. A mixture of 80% by weight of the fluoroester and 20% by weight of methylmethacrylate is preferred. These copolymers are coated from a solvent or solvent mixture to form an adherent, film-forming, flexible topcoat that will perform as described above.

In X-ray screen applications, the support can be heavy paper or cardboard, metal foil (e.g. aluminum), but preferably is composed of a macromolecular, hydrophobic organic polymer. Suitable examples are polymers of such monomers as cellulose derivatives (e.g., cellulose acetate, cellulose propionate, etc.), vinyl chloride, chloride/vinyl acetate, vinylidene chloride, vinyl acetate, acrylonitrile, and styrene. Polyesters, e.g., polyethylene terephthalate films, are particularly useful because of their dimensional stability. It is preferred to use biaxially oriented polyethylene terephthalate coated with a subbing layer as taught in Alles, et al., U.S. Pat. No. 2,729,684. The thickness of this support may be anywhere from about 0.0025 in. (0.0064 cm.) to 0.03 in. (0.0762 cm.) with 0.01 in. (0.0254 cm.) being preferred.

The support or film base, moreover, may be coated with, or have dispersed therein, dyes or finely divided pigments, e.g., $TiO_2$ to provide opacity or reflectivity or to absorb unwanted or scattered light caused by the exposure process to be described later. A reflective layer may be coated on the support either as a backing layer or interposed between the support and the active (phosphor) layer (described below). Preferably such a reflective layer is dispersed in a suitable binder such as that described by Brixner, Example 1 of U.S. Pat. No. 3,895,157. The reflective layer may be coated at a thickness of about 0.0003 in. (0.0007 cm.) to about 0.001 in. (0.00254 cm.) or more.

The phosphor in the active layer can be selected from a legion of well-known X-ray luminescent phosphors or phosphor particles taught by the prior art, and can be dispersed in any one of a host of suitable polymeric binder systems. The phosphors include, for example, calcium tungstate, zinc sulfide, zinc oxide and calcium silicate, zinc phosphate, alkali halides, cadmium sulfide, cadmium selenide, cadminum tungstate, magnesium fluoride, zinc fluoride, strontium sulfide, zinc sulfate, barium lead sulfate, gadolinium oxysulfide, lanthanum oxyhalides, barium fluorohalides, and mixtures of two or more of the above. Some of these phosphors may be enhanced by activation, for example, using small amounts of rare earth elements such as terbium, samarium, thulium, etc., as well-known to those skilled in the art. The phosphors are traditionally dispersed by milling with a binder (e.g., polyvinyl butyral) in suitable solvents and are coated on the support by well-known methods to thicknesses of 0.004 in. (0.010 cm.) to 0.014 in. (0.036 cm.). The term "phosphor" or "active layer", as used herein, will denote any suitable phosphor that luminesces on exposure to X-rays and is coated in a binder on a support. This luminescence may occur in the ultra violet, the blue, green, or even the red portion of the spectrum from 300 to 700 nm, for example, depending on which phosphor is used.

The protective topcoat of this invention is made by copolymerizing a fluoroester (e.g., polyfluoroalkylethylmethacrylate) with methylmethacrylate to form a hard, solid mass of copolymer. This mass is then crushed and dissolved in a suitable solvent for coating as a protective topcoat on one of the above described active layers. As stated above, the fluoroesters useful in this invention are prepared as described in U.S. Pat. No. 3,282,905, supra, and the fluoroester mixture is copolymerized with methylmethacrylate using a suitable initiator, e.g., 2,2'-azobis(isobutyronitrile), as fully described in U.S. Pat. No. 3,950,315, supra. Generally, the copolymer is prepared employing a mixture of about 10–75% by weight of methylmethacrylate and about 90–25% by weight of the fluoroester, in parts by weight of the mixture, preferably 80% fluoroester and 20% methylmethacrylate.

In preparing solutions of the aforesaid copolymers, fluorocarbon solvents (e.g., Freon®-TF, sold by E. I. du Pont de Nemours and Company, Wilmington, Del.) are preferred since they are nonflammable and have excellent dispersing properties for these topcoats. For copolymers prepared employing higher concentrations of the methylmethacrylate monomer, mixed solvents (e.g., Freon® type solvents and acetone) can be used.

The protective topcoat of this invention can be successfully coated over any of the above described phosphor-containing active layers. The preferred phosphor is a compound of the formula $$La_{(1-n)}Y_nOX$$

wherein X is a halogen (e.g., chlorine, bromine or fluorine), Y is either trivalent thulium or terbium or some other appropriate well-known activator, and n is 0.006 to 0.0001.

X-ray screens having the novel protective topcoat of this invention are suitable for all X-ray radiographic processes. They can be used without showing signs of cracking and crazing. These screens are eminently suitable for use with modern rapid changer systems such as the Cut Film Changer Type AOT-R, or PUCK, sold by Elema-Schonander, Sweden, and the Buckymat Automatic Film Changer sold by Buckymat, Seimens Corp., Rep. of Germany. In these rapid changer systems or simulators the protective topcoat of this invention coated over a phosphor layer has been found to survive well beyond the life of conventional X-ray screens without topcoat failure, indicating excellent adhesion to the active layer and excellent surface durability.

Screens having this topcoat are relatively static-free although small amounts of conventional antistats may be added to the topcoat or to the active layer to insure that static is fully controlled in the rapid changer systems, where it has been a problem in the past. Static is usually built up during the exchange of film into and out of the area or cassette containing the X-ray screens. This has been known to cause static marks by exposure of the sensitive photographic film. This cannot be tolerated.

The topcoats of this invention are highly resistant to stain. Stain is caused when some of the processing fluids, or other items commonly associated with darkroom handling (e.g. hand cream, soaps, coffee and the like) are spilled on the X-ray screen itself. Since X-ray screens are unusually expensive and are used over and over again, it is important to keep the topcoat clean and free of stain. Defects such as stains, dirt, etc. may show up later on the exposed film. Prior art elements tend to be easily stained by contact with the above mentioned fluids and materials. The topcoats of this invention are highly resistant to this staining.

This invention will now be illustrated by the following examples, of which Example 1 is considered to represent the best mode of carrying out the invention.

EXAMPLE 1

A reflective suspension was prepared by sand milling the following ingredients:

| | |
|---|---|
| Titanium dioxide | 100 g |
| Chlorosulfonated polyethylene | 40 g |
| n-butyl acetate | 100 g |
| Mixed petroleum naptha (Init BP 247° F., API Gr. 59–61 at 60° F., Sp Gr 0.7385) | 105 g |
| Dioctyl ester of sodium sulfosuccinic acid | 2 g |

The milled suspension was filtered, coated on a 0.010 in. (0.0254 cm.) thick biaxially oriented polyethylene terephthalate film sheet to a wet thickness of 0.010 in. (0.0254 cm.) and dried. Two samples were prepared.

A phosphor suspension was prepared by milling the following ingredients in a ball mill for about 16 hours:

| | |
|---|---|
| La OBr:.003 Tm | 700 g |
| Polyvinyl butyral | 285 g |

-continued

| (PVB) Binder solution |
|---|

The PVB solution was composed of the following ingredients:

| | |
|---|---|
| n-butyl acetate | 164 g |
| n-propanol | 164 g |
| Polymeric organic silicone soln (2% by wt in toluene) | 8.1 g |
| Potassium salt of monoethylphenylphenolmonosulfonic acid | 2.2 g |
| Glycerol monolaurate | 14 g |
| Polyvinyl butyral (granular, Intr. Visc. 0.81) | 54 g |

The phosphor suspension was then coated over the reflective layer on the above support. These elements were also dried.

Topcoat solutions were then prepared as follows:

| A. Prior Art Topcoat: | |
|---|---|
| Cellulose acetate (acetyl content of 55.8%) | 270 g |
| Urea formaldehyde resin (60% solids soln. in a mixture of 1 part xylene and 1.5 parts butanol of a butylated urea formaldehyde resin made according to U.S. Pat. No. 2,191,957) | 50 g |
| Acetone | 2676 g |
| Atlas G-3634 (I.C.I. catonic surfactant or antistat) | 3 g |
| Acrawax C (Glyco Chemical Corporation, Greenwich, Conn.) | .75 g |

| B. Topcoat of this Invention: | |
|---|---|
| Copolymer of a fluroester[1] (80 parts by weight) and methylmethacrylate (20 parts by weight) made according to the teachings of Ex. 1, U.S. Pat. No. 3,950,315 | 400 g |
| Freon ® - fluorocarbon solvent (E. I. du Pont de Nemours and Company | 4300 g |
| Acetone | 250 g |
| Atlas-G3634 | 5 g |

[1] $CF_3—CF_2—(CF_2—CF_2)_n—CH_2—CH_2—O—\overset{\overset{O}{\|}}{C}—\overset{\overset{CH_3}{|}}{C}=CH_2$ Topcoat A was coated on one sample of the phosphor layer prepared above and Topcoat B was coated on the other sample. Both were dried to form an X-ray fluorescent screen having (a) a support, (b) a reflective layer, (c) an active phosphor layer, and (d) a protective topcoat layer, so as to compare the topcoat of this invention (Screen B) with the prior art (Screen A).

Each of these screens were then placed in a Buckymat Simulator designed to simulate passage through a Buckymat Automatic Film Changer. After 25,000 cycles, which simulated the passage of 6250 sheets of film in interface with the screen, Screen A failed cohesively and the topcoat began to peel away from the active layer. Screen B, however, lasted more than 160,000 cycles with no failure of the topcoat. In addition, Screen A showed cracking when a sample thereof was bent back and forth to simulate handling. The procedure for testing the resistance of an X-ray screen to development of cracks and crazes is described in Bauer, U.S. Pat. No. 3,164,719. Screen B showed no signs of cracking or crazing. In addition, samples of Cronex ®-4 medical X-ray film (E. I. du Pont de Nemours and Company), i.e., a high speed gelatino-AgIBr emulsion coated double side on a 7 mil biaxially oriented polyethylene terephthalate film support, were exposed to each screen in a conventional manner and developed, fixed, washed and dried. The film exposed to Screen B had greater image sharpness than that exposed to Screen A. Sensitometric chracteristics (speed, gradient, fog, top density, etc.) were equivalent.

Finally, Screen B was found to be superior to Screen A in resisting staining. To test a screen for propensity to stain, the fluid to be tested (e.g., developer, fixer, coffee, hand lotion, etc.) is placed on a small area of the screen (e.g. on the topcoat) and the screen placed in a dark are for ca. 24 hours, or until the fluid was dried. The surface of the screen is then cleaned with soap and warm water and dried. A radiograph is made with the screen at 80 KVP and 2 ma with the time exposure adjusted to give a photographic density of 1.0±0.1 in the processed film. The film is then examined closed to see if the treated area of the screen has any effect on said film. This effect is usually noted as an area of light density if a significant amount of stain is left on the screen surface. The screen of this invention (Screen B) had no stains in this test whereas the prior art screen (A) showed significant stain.

EXAMPLE 2

Topcoat formulations representing the topcoat of this invention were made as described in Example 1 except that the methylmethacrylate was varied in each case.

Solutions of these formulations were made up as follows:

| Topcoat for Screen | Wt. % Methylmethacrylate | % Acetone | % Freon TF ® |
|---|---|---|---|
| A | 100 | 100 | 0 |
| B | 0 | 100 | 0 |
| C | 25 | 5 | 95 |
| D | 50 | 22 | 78 |
| E | 75 | 29 | 71 |
| F | 20 | 5 | 95 |
| G | 40 | 100 | 0 |
| H | 60 | 100 | 0 |

All screens made with these topcoats were satisfactory for adhesion and image quality in all the tests outlined above but screens A and B were not stain-resistant. Sample A also failed to survive the automatic changer test. This Example demonstrates that it is necessary to copolymerize methylmethacrylte with a fluoroester in order to prepare a polymer which is useful as an X-ray screen topcoat.

EXAMPLE 3

A topcoat solution identical to that described in Example 1 was prepared. Samples from this solution were used to prepare protective topcoats for a variety of phosphor-containing active layers including $CaWO_4$, $Gd_2O_2S$; mixtures of $Gd_2O_2S$ and LaOBr, and BaFCl:Eu. The topcoat served to protect all of these active layers in a like manner; i.e., these screens passed all tests described in Ex. 1.

EXAMPLE 4

Two topcoat solutions identical to those described in Example 1 were prepared. 13 g of Atlas G-3634 antistat and 13 g of Syloid-620 ($SiO_2$ from E. I. du Pont de Nemours and Company) was added to each solution and coated over an active layer identical to that of Example 1. These screens were tested in both the Cut Film Changer Type AOT-R and Type PUCK sold by Elema-Schonander, Sweden. The screen having the topcoat of this invention showed superior performance in both units and had better air-bleed times, i.e., photographic films could be released from these screens more rapidly than from controls, without any loss of image quality.

I claim:

1. An X-ray image intensifying screen comprising, in order, a support, an active layer on said support comprising fluoroescent phosphor particles dispersed in a film-forming binder, and a protective topcoat on said active layer, characterized in that said topcoat is a flexible film composed of a copolymer of (1) a fluoroester of the formula:

$$CF_3-CF_2-(CF_2)_n-CH_2-CH_2-O-\overset{O}{\overset{\|}{C}}-\overset{CH_3}{\overset{|}{C}}=CH_2$$

wherein n is an integer from 2 to 9, and (2) methylmethacrylate.

2. The intensifying screen of claim 1 where n is an integer from 3–5.

3. The intensifying screen of claim 1 wherein the copolymer is prepared from a mixture of 80% fluoroester and 20% methylmethacrylate.

4. The intensifying screen of claim 1 wherein the support is a biaxially oriented polyethylene terephthalate film.

5. The intensifying screen of claim 1 wherein the film-forming binder is polyvinyl butyral.

6. The intensifying screen of claim 1 wherein the phosphor particles are composed of lanthanum oxybromide activated with thulium.

7. The intensifying screen of claim 1 wherein the protective topcoat is coated from an acetone/fluorocarbon solvent solution.

8. The intensifying screen of claim 1 wherein a light-reflecting layer is present between the active layer and its support.

9. The intensifying screen of claim 1 in combination with a photosensitive X-ray film.

* * * * *